United States Patent [19]

Tsugane et al.

[11] Patent Number: 5,045,942
[45] Date of Patent: Sep. 3, 1991

[54] DIGITAL VIDEO COMMUNICATION SYSTEM HAVING A NETWORK CLOCK SOURCE

[75] Inventors: Shuzo Tsugane, Miyagi; Sadaharu Hiratsuka, Tokyo; Toshio Kawaji, Tokyo; Yasushi Sano, Tokyo, all of Japan

[73] Assignee: NEC Corporation, Japan

[21] Appl. No.: 272,709

[22] Filed: Nov. 17, 1988

[30] Foreign Application Priority Data

Nov. 18, 1987 [JP] Japan .................................. 62-289573
Sep. 29, 1988 [JP] Japan .................................. 63-242279

[51] Int. Cl.$^5$ .............................................. H04N 7/04
[52] U.S. Cl. ...................................... 358/148; 358/149
[58] Field of Search .................. 358/141, 13, 148, 149

[56] References Cited

U.S. PATENT DOCUMENTS 3,424,864  1/1969  Williams .............................. 358/149

FOREIGN PATENT DOCUMENTS 0117613  7/1986  Japan .

Primary Examiner—James J. Groody
Assistant Examiner—David E. Harvey
Attorney, Agent, or Firm—Ostrolenk, Faber, Gerb & Soffen

[57] ABSTRACT

In a digital video communication system, a network clock source is provided to supply a common clock pulse synchronized with the transmission speed of the system to each station through a transmission channel to allow it to derive a video sync pulse. This sync pulse is applied to a video signal source to generate an analog composite television signal. A quantization sampling pulse is derived from the video sync pulse which is contained in the composite television signal to quantize the composite television signal. The quantized video signal is stored in a buffer and forwarded to a receiver station in response to the received network clock pulse, so that the quantization sampling rate and the transmission sampling rate of a transmitter station of the system are synchronized with each other. The sampling rate of the dequantization process at the receiver station is also synchronized with the transmission sampling rate.

13 Claims, 2 Drawing Sheets

DIGITAL VIDEO COMMUNICATION SYSTEM HAVING A NETWORK CLOCK SOURCE

BACKGROUND OF THE INVENTION

The present invention relates to a digital video communication system.

With current digital video communication systems, a video signal source such as television camera is synchronized with a clock rate determined independently from the transmission rate of the system. Therefore the quantization sampling rate at which the video signal from the camera is digitized differs from the transmission sampling rate at which it is transmitted to a receiver station. If the receiver station communicates with multiple transmitter stations using different sampling frequencies, the video signals received from these sources must be synchronized with each other in order to allow several video programs to be processed with a single clock rate and to be cut and pasted onto a single screen. One approach is to use a frame synchronizer to eliminate the differences in clock rate. According to another prior art technique, the quantization sampling rate information is transmitted with a video signal encoded by a predictive encoder to a receiver station. The latter is provided with a clock recovery circuit with which the original sampling clock rate is recovered for dequantizing the digital video signal. A further approach as described in Japanese Patent 61-30456 involves the detection of the ratio between the quantization and transmission sampling rates. The detected ratio is multiplexed with a digitized signal and transmitted to a receiver station.

Any of the foregoing prior art approaches adds to the complexity and the total cost of the system. In addition, the use of the frame synchronizer, in particular, causes an out-of-sync condition with a received signal when channel switching occurs.

SUMMARY OF THE INVENTION

It is, therefore, an object of the present invention to provide a digital video communication system, which is inexpensive, to establish synchronism between quantization and transmission sampling rates or between the clock rates of signals from different transmitter stations.

The object is attained by the provision of a network clock source which supplies a common clock pulse which is synchronized with the transmission speed of the system.

According to the present invention, the network clock pulse is received by each station of the system through a transmission channel to derive a video sync pulse. This sync pulse is applied to a video signal source to allow it to generate an analog composite television signal. A quantization sampling pulse is derived from the video sync pulse which is contained in the composite television signal to quantize the composite television signal. A buffer is provided to store the quantized video signal for forwarding the stored signal to a receiver station in response to the received network clock pulse, whereby the quantization sampling rate and the transmission sampling rate of a transmitter station of the system are synchronized with each other. The sampling rate of the dequantization process at the receiver station is also synchronized with the transmission sampling rate.

BRIEF DESCRIPTION OF THE DRAWINGS

The present invention will be described in further detail with reference to the accompanying drawings, in which.

DETAILED DESCRIPTION

Figure 1:
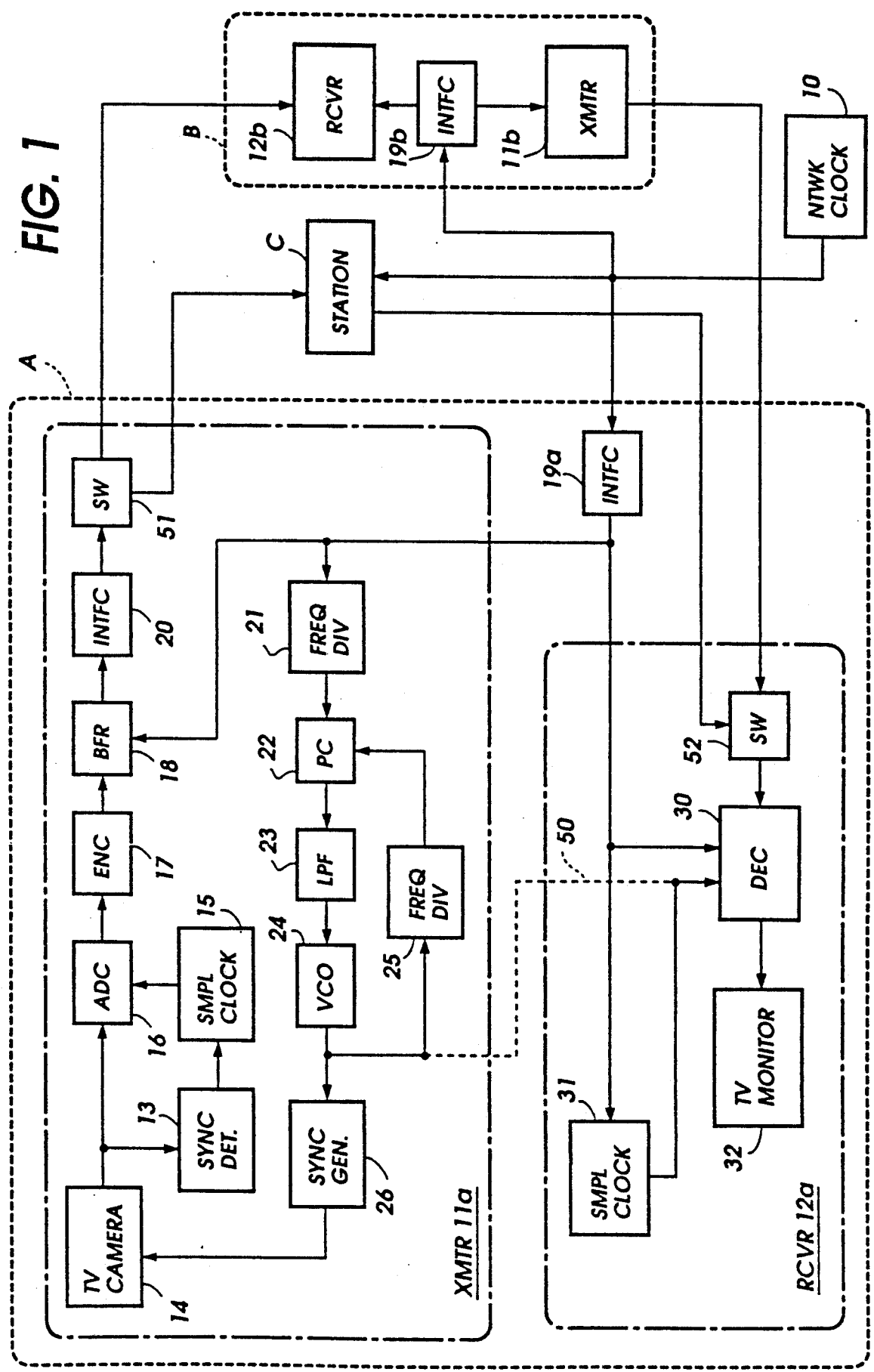
FIG. 1 is a block diagram of a digital video communication system of the present invention.

Referring now to FIG. 1, there is shown a digital video communication system according to an embodiment of the present invention. The system generally comprises a network clock source 10 located at the center of the system and a plurality of geographically scattered stations A, B and C, each having a transmitter 11 and a receiver 12. The transmitter 11a of station A comprises a sync detector 13 connected to the output of a video input source 14 or television camera or the like to detect the color burst from an analog composite television signal supplied from the camera 14. The detector 13 supplies the detected color burst to a sampling clock generator 15. Sampling clock generator 15 multiples the color burst frequency (3.579545 MHz) and generates a sampling clock pulse at 14.31818 MHz which is four times the original frequency. The analog video signal from the television camera 14 is also applied to an analog-to-digital converter 16 where it is sampled at the rate of the 14.31818-MHz quantization sampling pulse and translated into a digital signal and fed to a high efficiency encoder such as a predictive encoder 17 for bandwidth compression. The output of the predictive encoder 17 is coupled to a transmit buffer 18.

The network clock source 10 supplies a 6.176-MHz clock pulse equal to the frequency of the primary group of the conventional PCM transmission system which is employed between the stations A, B and C. Station A receives this network clock pulse through a line interface 19a and supplies it to the transmit buffer 18 to forward the stored data bits to the receiver 12 of station B or C through a line interface 20 by way of a channel switching circuit 51. The network clock at the output of interface 19a, is also applied to a frequency divider 21 which divides the 6.176-MHz clock frequency by a factor of 779 to obtain a low-frequency clock pulse at a frequency 7.92811296 kHz. This low-frequency network clock is supplied to a phase comparator 22 of a phase-lock loop for comparison with the output of a divide-by-1,806 frequency divider 25. The output of phase comparator 22 is passed through a low-pass filter 23 and fed to a voltage controlled oscillator 24 whose output is coupled to the frequency divider 25, so that the output frequency of the V.C.O. 24 is maintained at 14.31817202 MHz. A sync generator 26 is supplied with this V.C.O. 24 output to generate a sync pulse at a frequency which is $\frac{1}{4}$ of 14.31817202 MHz, i.e., 3.579543 MHz. This sync pulse is supplied to the television camera 14 as a reference frequency for the generation of the color burst and vertical and horizontal sync pulses to form a composite television signal with luminance and chrominance signals. Although there is a frequency difference of 0.56 ppm between this reference frequency and the frequency of the color burst generated in the television camera 14, the amount of this frequency difference is within the range of allowances of the system. In a similar manner, the network clock from source 10 is coupled to a line interface 19b of station B and fed to a transmitter 11b and a receiver 12b, and further coupled to station C.

A video signal from the transmitter 11b of station B or a signal from station C is selected by way of a channel switching circuit 52 and received by a predictive decoder 30 of receiver 12a of station A for bandwidth decompression and the network clock is supplied to it as well as to a sampling clock generator 31. A video monitor 32 is connected to the output of decoder 30 to provide a display of the received video signal.

Figure 2:
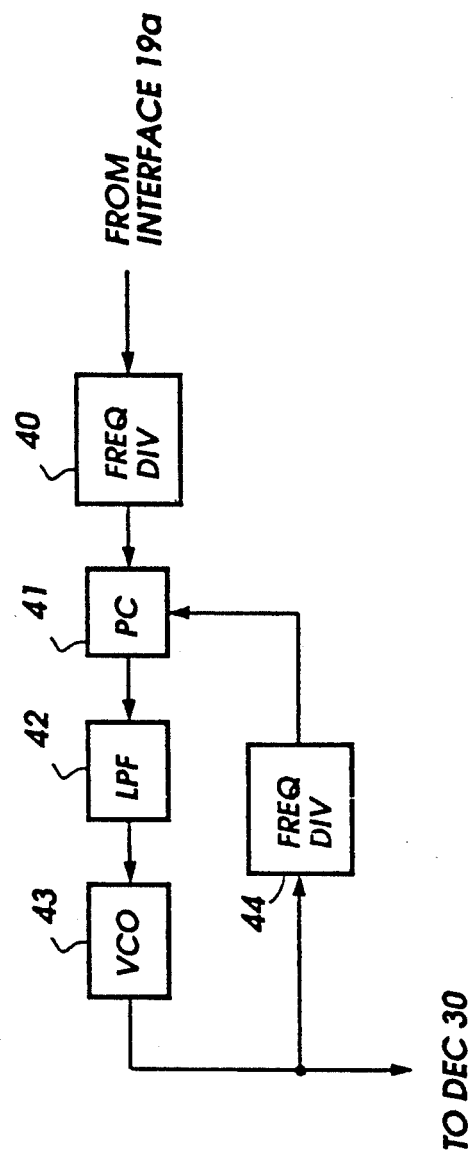
FIG. 2 is a block diagram of a sampling pulse generator of FIG. 1.

As illustrated in FIG. 2, the sampling clock generator 31 comprises a frequency divider 40 which divides the network clock frequency by the same factor 799 as the frequency divider 21 of the transmitter. The low-frequency clock output is supplied to a phase comparator 41 where it is compared with the output of a divide-by-1,806 frequency divider 44, the output of phase comparator 41 being applied through a low-pass filter 42 to a V.C.O. 43 whose output is fed to the frequency divider 44 n a manner similar to the transmitter 12. Thus, the output of V.C.O. 43 is maintained at a frequency 14.31817202 MHz which is supplied as a reference clock to the predictive decoder 30. There is also a frequency difference of 0.56 ppm from the frequency of the color burst generated by decoder 30 as in the transmitter. However, the amount of this frequency difference is within the allowable range of the predictive decoder 30.

It will be seen that the output of V.C.O. 24 can be used, instead of the sampling clock generator 31, as the reference clock of the predictive decoder 30 by supplying it through a conductor indicated by a dashed line 50 in FIG. 1.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A digital video communication system comprising:
   a network clock source for generating a network clock pulse synchronized with a transmission speed of said video communication system;
   frequency generator means for receiving said network clock pulse through a transmission channel and deriving therefrom a sampling frequency and a reference subcarrier frequency;
   a video signal source for generating an analog composite television signal by using said reference subcarrier frequency;
   quantizer means for quantizing said analog composite television signal at said sampling frequency to produce a quantized composite television signal;
   buffer means synchronized with said network clock pulse for transmitting the quantized composite television signal to a receiving station at the transmission speed of said communication system; and
   dequantizer means for receiving a quantized composite television signal from said receiving station and dequantizing the received signal by using said sampling frequency to recover an analog composite television signal.

2. A digital video communication system as claimed in claim 1, wherein the frequency of said network clock pulse is an integral multiple of the frequency of a signal transmitted by a PCM transmission system.

3. A digital video communication system as claimed in claim 2, wherein said sampling frequency is an integral multiple of said reference subcarrier frequency.

4. A digital video communication system as claimed in claim 2, wherein said frequency generator means comprises:
   a first frequency divider for dividing the frequency of said network clock pulse by a first prescribed dividing factor;
   a phase-locked loop for receiving the output of said first frequency divider as a first signal and detecting a phase difference between said first signal and a second signal applied thereto and generating said sampling frequency in accordance with said phase difference;
   a second frequency divider for dividing said sampling frequency by a second prescribed dividing factor and applying the divided frequency to said phase-locked loop as said second signal; and
   means for dividing said reference subcarrier frequency from said sampling frequency.

5. A digital video communication system as claimed in claim 4, wherein the frequency of said network clock pulse is 6.176 MHz and wherein said first and second prescribed dividing factors are 799 and 1,806, respectively.

6. A digital video communication system as claimed in claim 1, wherein said quantizer means includes a predictive encoder and said dequantizer means includes a predictive decoder.

7. A digital video communication system as claimed in claim 1, further comprising means for receiving said network clock pulse through said transmission channel and deriving therefrom a second sampling frequency equal to the first-mentioned sampling frequency, wherein said dequantizer means provides dequantization using said second sampling frequency.

8. A digital video communication system comprising:
   a network clock source for generating a network clock pulse synchronized with a transmission speed of said video communication system; and
   a plurality of stations interconnectable by transmission channels, each of said stations comprising:
   frequency generator means for receiving said network clock pulse through a transmission channel and deriving therefrom a sampling frequency and a reference subcarrier frequency;
   a video signal source for generating an analog composite television signal by using said reference subcarrier frequency;
   means for quantizing said composite television signal at said sampling frequency;
   means responsive to said network clock pulse for transmitting the quantized composite television signal to a receiving station at the transmission speed of said communication system;
   means for receiving a quantized composite television signal from said receiving station and dequantizing the received quantized signal at said sampling frequency; and
   channel switch means for providing a switched connection between said stations via said transmission channels.

9. A digital video communication system as claimed in claim 8, wherein the frequency of said network clock pulse is an integral multiple of the frequency of a signal transmitted by a PCM transmission system.

10. A digital video communication system as claimed in claim 9, wherein said sampling frequency is an integral multiple of the frequency of a color burst of said composite television signal generated by said video signal source.

11. A digital video communication system as claimed in claim 9, wherein said frequency generator means comprises:

a first frequency divider for dividing the frequency of said network clock pulse by a first prescribed dividing factor;

a phase-locked loop for receiving the output of said first frequency divider as a first signal and detecting a phase difference between said first signal and a second signal applied thereto and generating said sampling frequency in accordance with said phase difference;

a second frequency divider for dividing said sampling frequency by a second prescribed dividing factor and applying the divided sampling frequency to said phase-locked loop as said second signal; and means for deriving said reference subcarrier frequency from said sampling frequency.

12. A digital video communication systems as claimed in claim 11, wherein the frequency of said network clock pulse is 6.176 MHz and wherein said first and second prescribed dividing factors are 799 and 1,806, respectively.

13. A digital video communication system as claimed in claim 8, wherein said quantizing means includes a predictive encoder and said dequantizing means includes a predictive decoder.

* * * * *